United States Patent
Kalafala et al.

(10) Patent No.: US 9,858,383 B2
(45) Date of Patent: Jan. 2, 2018

(54) INCREMENTAL PARASITIC EXTRACTION FOR COUPLED TIMING AND POWER OPTIMIZATION

(71) Applicant: International Business Machines Corporation, Armonk, NY (US)

(72) Inventors: Kerim Kalafala, Rhinebeck, NY (US); Tsz-Mei Ko, Poughkeepsie, NY (US); Ravichander Ledalla, Fishkill, NY (US); Alice H. Lee, Belmont, MA (US); Adam P. Matheny, Beacon, NY (US); Jose L. Neves, Poughkeepsie, NY (US); Gregory M. Schaeffer, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 31 days.

(21) Appl. No.: 14/973,893

(22) Filed: Dec. 18, 2015

(65) Prior Publication Data
US 2017/0177784 A1    Jun. 22, 2017

(51) Int. Cl.
G06F 17/50   (2006.01)

(52) U.S. Cl.
CPC ...... *G06F 17/5081* (2013.01); *G06F 2217/78* (2013.01); *G06F 2217/82* (2013.01); *G06F 2217/84* (2013.01)

(58) Field of Classification Search
CPC .......................... G06F 17/5036; G06F 17/5081
(Continued)

(56) References Cited

U.S. PATENT DOCUMENTS 6,499,131 B1 * 12/2002 Savithri et al. ............... 716/115
7,581,201 B2    8/2009 Kazda et al.
(Continued)

FOREIGN PATENT DOCUMENTS

WO    2009158206 A1    12/2009
WO    2011117162 A1    9/2011

OTHER PUBLICATIONS

Kahng,"Design technology productivity in the DSM era", InDesign Automation Conference, 2001. Proceedings of the ASP-DAC 2001. Asia and South Pacific, pp. 443-448. IEEE, 2001.
(Continued)

*Primary Examiner* — Suchin Parihar
(74) *Attorney, Agent, or Firm* — Cantor Colburn LLP; Steven Meyers (57) ABSTRACT

An incremental parasitic extraction system includes a noise analysis module configured to perform a first noise analysis on at least one first net with respect to at least one aggressor net. The incremental parasitic extraction system further includes an optimizer module and an extraction module. The optimizer module performs a first optimization activity on the at least one first net based on results of the first noise analysis. The optimizer module further generates a first invalidation list based on the first optimization activity, and a second invalidation list based on a type of the first optimization action so as to add the second invalidation list to the first invalidation list. The extraction module processes the first and second invalidation lists and performs an extraction and noise analysis process on the first and second invalidation lists so as to determine at least one new RC network and associated noise analysis results.

20 Claims, 9 Drawing Sheets

| | Optimization Action | Invalidation Lists | |
|---|---|---|---|
| | | Created by action | Created by query timing |
| Route net | Move wire | Net and neighbors | New neighbors |
| | Retag wire | Net and Neighbors | New neighbors |
| | Add net | N/A | New neighbors |
| | Delete net | Neighbors | N/A |
| Preserve routes | Repower gate | In / out nets and neighbors | N/A |
| | Swap gate | In / out nets and In / out neighbors | N/A |
| | Add gate | Net and neighbors | New neighbors |
| | Delete gate | In net and In / out neighbors | N/A |
| | Move gate | In / out nets and In / out neighbors | New in / out neighbors |

(58) Field of Classification Search
USPC .......................................................... 716/115
See application file for complete search history.

(56) References Cited

U.S. PATENT DOCUMENTS

| | | | |
|---|---|---|---|
| 8,595,669 B1* | 11/2013 | Keller et al. ................. | 716/115 |
| 2002/0078425 A1 | 6/2002 | Mehrotra et al. | |
| 2003/0177455 A1 | 9/2003 | Kaufman et al. | |
| 2007/0277131 A1 | 11/2007 | Schaeffer et al. | |
| 2008/0172642 A1 | 7/2008 | Abbaspour et al. | |
| 2008/0209376 A1 | 8/2008 | Kazda et al. | |
| 2009/0199139 A1 | 8/2009 | White et al. | |
| 2009/0319977 A1 | 12/2009 | Saxena et al. | |
| 2012/0254818 A1 | 10/2012 | Liu et al. | |
| 2013/0091480 A1 | 4/2013 | Horlacher et al. | |
| 2013/0275110 A1* | 10/2013 | Kartschoke ......... | G06F 17/5031 |
| | | | 703/14 |

OTHER PUBLICATIONS

Ye et al.,"Incremental large-scale electrostatic analysis", Computer-Aided Design of Integrated Circuits and Systems, IEEE Transactions on 28, No. 11, Nov. 2009, pp. 1641-1653.

* cited by examiner

| Wire Representation | Parasitic Extraction (R, C Values / length) | RC Network Structure |
| --- | --- | --- |
| No Wires (Steiners) | Table Lookup | RC network with $C_{coupling}$ to ground |
| Pre–Wires | R – Table lookup<br>C – Table lookup | RC network with $C_{coupling}$ to ground |
| Routed (1)<br>Global wires | R – Table lookup<br>C – Table lookup | RC network with $C_{coupling}$ to ground |
| Routed (2)<br>Detailed with shorts | R – Table lookup<br>C – extracted 2.5 D | Annotated + Combined Modeling |
| Routed (3)<br>Detailed clean | R – Extracted<br>C – extracted 3 D | Annotated + Combined Modeling |

| Optimization Action | Invalidation Lists | |
|---|---|---|
| | Created by action | Created by query timing |
| Route net | | |
| Move wire | Net and neighbors | New neighbors |
| Retag wire | Net and Neighbors | New neighbors |
| Add net | N/A | New neighbors |
| Delete net | Neighbors | N/A |
| Preserve routes | | |
| Repower gate | In / out nets and neighbors | N/A |
| Swap gate | In / out nets and In / out neighbors | N/A |
| Add gate | Net and neighbors | New neighbors |
| Delete gate | In net and In / out neighbors | N/A |
| Move gate | In / out nets and In / out neighbors | New in / out neighbors |

INCREMENTAL PARASITIC EXTRACTION FOR COUPLED TIMING AND POWER OPTIMIZATION

BACKGROUND

The present invention relates to semiconductor fabrication and more specifically, to perform uplift analysis and optimization of fabricated semiconductor chips.

Very-large-scale integration (VLSI) is a traditional process used to create an integrated circuit (IC) by combining thousands of semiconductor devices (e.g., transistors) into a single semiconductor wafer, i.e., chip. High-performance VLSI design requires a very accurate representation of three-dimensional (3D) parasitic data which is then incorporated into different analysis and optimization tools. For example, 3D parasitic coupling information is used by timing, noise and power analysis, and optimization tools. This parasitic coupling information is useful in design optimization since the existence of parasitic coupling can reduce signal propagation time and introduce noise in a semiconductor network formed on the chip.

Various optimization tools are used to analyze the current state of the design with respect to one or more analysis-criteria perform-changes (ACPCs). The results from the ACPC analysis may be utilized to improve the criteria and re-analyze the state of the design to indicate whether improvement was in fact achieved. Previous approaches, however, either capture only the changes of directly connected components or manage the coupling by continuously re-calculating the Miller-factor (i.e., k-factors) of the design.

The infra-structure to support the analysis of a design change is typically incremental due to the requisite accuracy and turn-around time. In order to satisfy the accuracy and time limitations, incremental on demand parasitic extraction schemes are typically employed in traditional incremental analysis systems to obtain the parasitic information utilized by various analysis and optimization tools. The extracted parasitic information typically includes obtaining capacitance and resistance information between a first net and one or more adjacent nets. However, maintaining the combined parasitic network necessary to conduct incremental on demand parasitic extraction while performing incremental design changes requires complex actions to ensure the combined extracted network is kept up-to-date.

SUMMARY

According to a non-limiting embodiment, an incremental parasitic extraction system includes a noise analysis module configured to perform a first noise analysis on at least one first net with respect to at least one aggressor net. The incremental parasitic extraction system further includes an optimizer module and an extraction module. The optimizer module performs a first optimization activity on the at least one first net based on results of the first noise analysis. The optimizer module further generates a first invalidation list based on the first optimization activity, and a second invalidation list based on a type of the first optimization action so as to add the second invalidation list to the first invalidation list. The extraction module processes the first and second invalidation lists and performs an extraction and noise analysis process on the first and second invalidation lists so as to determine at least one new RC network and associated noise analysis results.

According to another non-limiting embodiment, a method of optimizing a semiconductor device comprises performing a first noise analysis on at least one first net with respect to at least one aggressor net located adjacent to the at least one first net, and performing a first optimization activity on the at least one first net based on results of the first noise analysis. The method further includes generating a first invalidation list based on the first optimization activity, generating a second invalidation list based on a type of the first optimization action, and adding the second invalidation list to the first invalidation list. The method further includes processing the first and second invalidation lists and performing an extraction and noise analysis process on the first and second invalidation lists so as to determine at least one new RC network and associated noise analysis results.

According to still another non-limiting embodiment, a computer program product controls an electronic device to optimize a semiconductor device. The computer program product comprises a computer readable storage medium having program instructions embodied therewith. The program instructions are executable by an electronic computer processor to control the electronic device to perform operations comprising performing a first noise analysis on at least one first net with respect to at least one aggressor net located adjacent to the at least one first net, and performing a first optimization activity on the at least one first net based on results of the first noise analysis. The operations further include generating a first invalidation list based on the first optimization activity, generating a second invalidation list based on a type of the first optimization action, and adding the second invalidation list to the first invalidation list. In addition, device performs operations of processing the first and second invalidation lists and performing an extraction and noise analysis process on the first and second invalidation lists so as to determine at least one new RC network and associated noise analysis results Additional features are realized through the techniques of the present invention. Other embodiments are described in detail herein and are considered a part of the claimed invention. For a better understanding of the invention with the features, refer to the description and to the drawings.

DETAILED DESCRIPTION

Various embodiments of the disclosure provide an incremental parasitic extraction system that achieves coupled timing and power optimization of a semiconductor network formed on a semiconductor chip. In at least one non-limiting embodiment, the incremental parasitic extraction system operates as an evaluation system capable of registering all the design changes, but recalculates an analysis parameter only if a function, tool, or the designer requests the parameter. In at least one embodiment, the incremental parasitic extraction system combines and un-combines extracted parasitic RC networks comprising a plurality of nets to perform uplift noise analysis. A net includes, for example, a plurality of electrical components such as, for example, gates, wires, etc., to form a circuit at a respective wiring level.

In addition, at least one non-limiting embodiment identifies netlist changes during optimization and determines how the netlist changes are processed to enable an incremental uplift analysis system suitable for incremental optimization. Optimization includes, for example, increasing signal propagation through a semiconductor network formed on a chip and/or improving the power efficiency of the semiconductor network. Accordingly, the incremental parasitic extraction system is capable of collecting all types of netlist changes. Further, at least one embodiment provides an incremental uplift module that utilizes the incremental parasitic extraction results so as to perform an incremental uplift analysis. In this manner, the incremental uplift module can identify any type of netlist change and dynamically update the netlist as the changes occur to provide an accurate representation of the design state at any instance in time.

For the purposes of this disclosure typical analysis parameters include, but are not limited to, slack, slew, delay, etc. Typical design changes include, but are not limited to, changing the wirecode and use-layer of a net (e.g., properties to guide the router on how to route a net), rerouting and/or buffering a net, changing the net driver properties, moving a location of a gate, insert and/or removing a gate, changing the type of gate, etc. In addition, accurate timing and noise analysis may include building parasitic RLC circuits that represent the three-dimensional (3D) environment for every net in the design. In practical terms, however, the inductance (L) may be negligible or non-existent for most nets. As such, it should be appreciated that any figures described herein may illustrate RC networks as opposed to RLC networks without departing from the scope of the inventive teachings.

According to at least one embodiment, a two-operation approach may be performed to achieve incremental extraction and analysis from a runtime standpoint while maintaining accuracy. In one operation, an Annotated Coupling operation is performed. The Annotated Coupling operation includes performing parasitic extraction based on an RC network for a net with additional information regarding all the coupling information associated with each net. A second operation known as Combined Coupling may be performed.

The Combined Coupling operation utilizes a complex RC network capable of performing accurate timing delay analysis. Once the analysis is performed, the network is restored to its Annotated Coupling state. In at least one embodiment where the system is an incremental system, for example, the first operation represents the RC network of any net in the design, and the second operation calculates the timing delay. The timing delay may include, for example, the delay through a net corresponding to the first timing analysis, or a changed delay affecting the network due to a design change.

Figure 1:
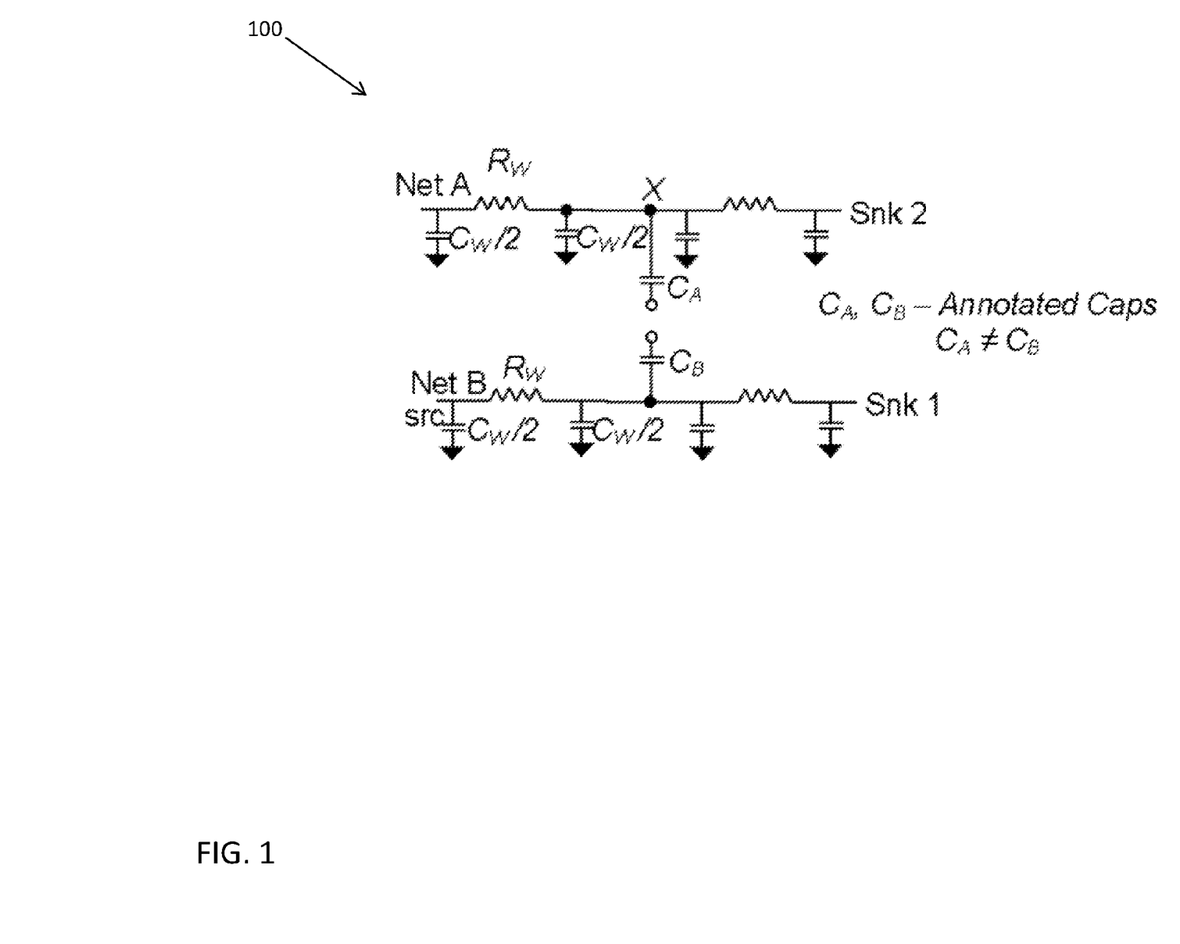
FIG. 1 illustrates a resistance-capacitance (RC) network utilized to perform incremental extraction and coupling analysis according to a non-limiting embodiment.
Figure 2:
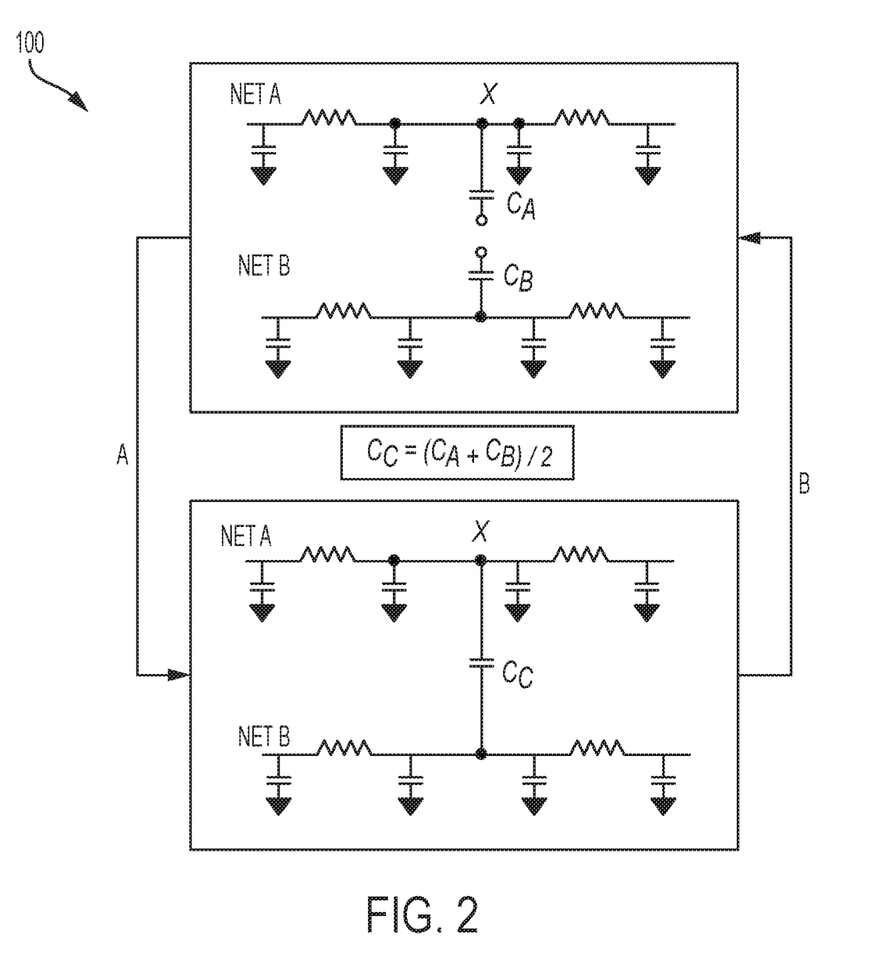
FIG. 2 illustrates a combined annotated coupling network of the RC network illustrated in FIG. 1.

With reference to FIGS. 1 and 2, incremental extraction and coupling analysis is performed according to two operations. In the first operation, an RC network 100 is built for a first net containing resistance (R) and capacitance (C) connected to a reference points (e.g., ground). Furthermore, the first operation includes the coupling capacitance (Cc) (see FIG. 2) with one terminal connected to the net RC network 100 where the coupling starts, and the other terminal left open. The open terminal contains additional information used to build the complex RC network during the second operation. This information is the neighbor(s) net name and geometric x/y/z coordinates where the coupling occurs.

Considering the network in FIG. 1, Net A couples to Net B starting at point "X." The capacitance coupling value is determined from a geometric/parasitic extractor system, such as, for example, IBM's RBE and 3DX. The variables "Rw" and "Cw" are the resistance and capacitance, respectively, of the network with respect to ground. These are represented appropriately as distributed PI-models as understood by one of ordinary skill in the art. The variable "CA" is the coupling capacitance between Net A and Net B. Likewise, "CB" is the coupling capacitance between Net B and Net A. The open terminal of CA contains the X/Y/Z coordinates of location X in Net B as well as the net name (Net B). Similarly, the open terminal of CB contains the X/Y/Z coordinates of location X in Net A as well as the net name (Net A). Note that the coordinates stored on each terminal are not the same as the nets and do not occupy the same space. Furthermore, the coupling capacitance values (CA and CB) are not necessarily the same since they are determined by the 3D geometric information around the coupling location. In at least one embodiment, the Annotated Coupling RC networks are built for every net in the design. Once analysis information (e.g., slack, slew, power, noise, etc.) is requested, the second operation is executed dynamically in real-time for each affected net.

Referring to FIG. 2, the Combined Coupling operation allows for building more complex RC networks to accurately model the propagation of data on the RC network. For example, the delay of a signal from the source to any sink of Net A may be different if the coupling capacitances CA and CB are not included. The delay may is also vary if the RC network of Net B from the source to the coupling point is not included. For these reasons a more complex network is built for analysis purposes (arrow A) and restored to its original structure after the analysis is performed (arrow B).

The proposed RC networks described above are well suited for systems that support multiple levels of analysis accuracy. For example, consider the operation of timing analysis, which is an operation performed thousands of times throughout the design cycle of a complex VLSI processor. This operation is executed for both analysis as well as optimization. When performing a timing analysis, delays across nets are calculated between the source and each sink using an RC model. Furthermore, slack and slews are calculated for each of the net pins or terminals. Since each part of the design evolves at a different pace there is no need to perform complex electrically coupled RC network analysis until the logic design has reached a stage where meaningful routed timing is possible. Until then the coupling capacitors can be grounded. Furthermore, the system must support different data quality at all instances. Also, parasitic data typically exists in the design at all times.

Figure 3:
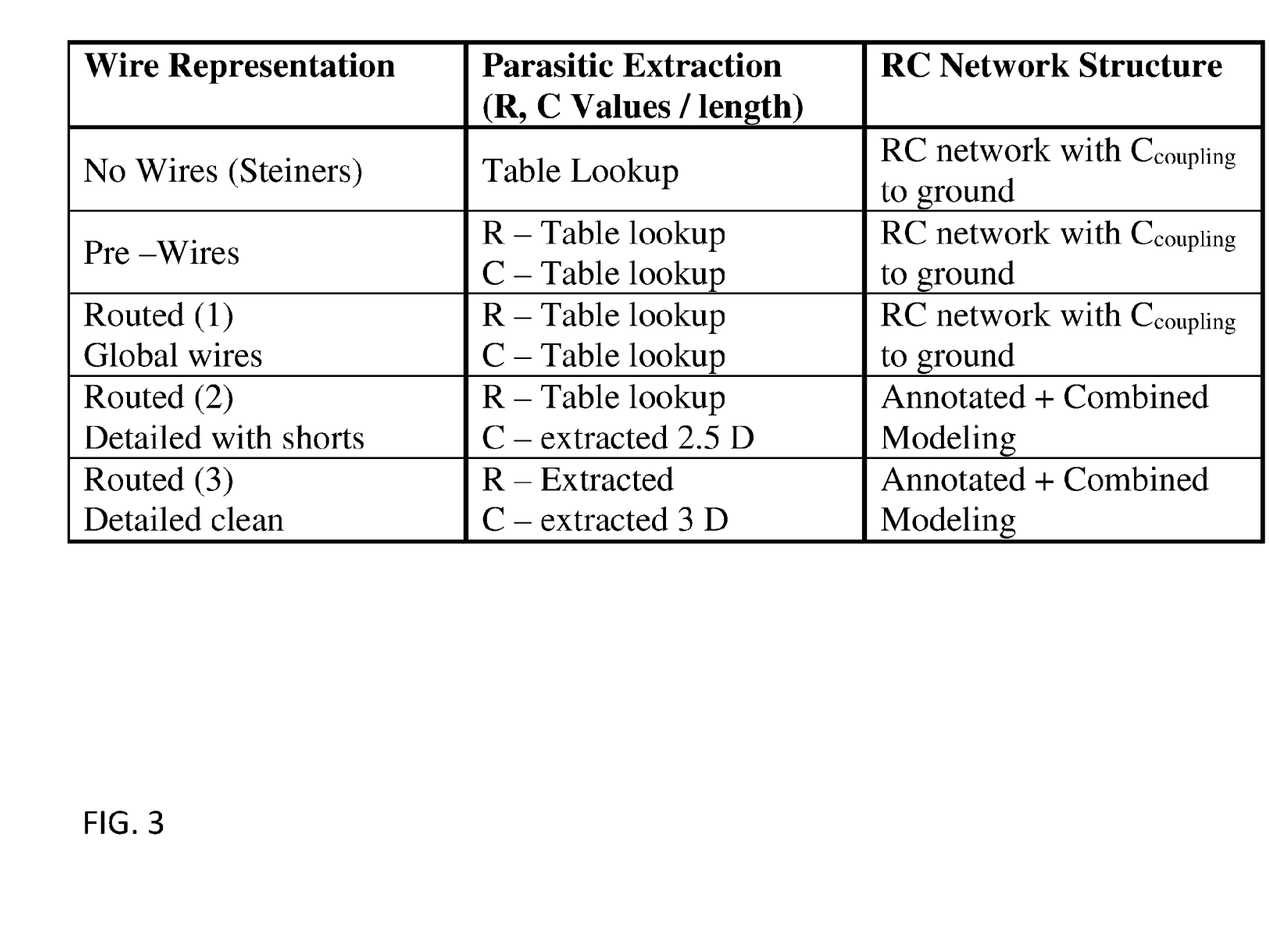
FIG. 3 is a table illustrating various types of wiring representations according to a non-limiting embodiment.

In various instances, the connectivity between gates may be defined. At any time until the end of the analysis it is possible to have any of the five types of wiring representation illustrated in the table of FIG. 3. At least one embodiment, therefore, provides an infrastructure configured to support analysis of wired designs where capacitive coupling is processed incrementally such that incremental in-core optimization can be targeted and analyzed. In this manner, the speed of both the timing analysis as well as the timing optimization operations can be increased. Once the design matures, timing analysis with explicit coupling can be performed. This is accomplished by passing a parameter to the sub-system in charge of building the RC networks for analysis. Accordingly, a designer can utilize this parameter to control the types of analysis within the same design session.

In a complex processor with several metal layers for routing it is common that Net A coupling to another Net B may also couple to other nets in the design. Furthermore, Net B may also couple to other nets which may or may not couple back to Net A. The timing analysis of Net A in a coupled system will include the coupling capacitor between Nets A and B (see FIG. 2). If Net B couples to other nets other than Net A, these coupling capacitors are treated according to the desired accuracy required by the analysis. In a first order, the analysis of Net A will only include the coupling capacitors between Net A and immediate neighbors. Any coupling capacitances of the neighbors that do not couple to Net A are grounded. In a second order, the RC network to analyze Net A is built with explicit coupling RC networks between Net B and other nets.

This level of incremental accuracy can continue for as many levels as it is needed by the analysis and/or optimization functions. For timing analysis purposes, the first order model is used. However, there could be cases where the coupling analysis may need to be extended beyond the first order just to guarantee that no other adverse effects negatively impact the analysis. In at least one embodiment, the system can expand or contract the size of the RC coupled network according to the needs of the analysis being performed. Furthermore, these changes can happen within the same design session allowing the designer to trade-off between speed of analysis and accuracy.

Figure 4:
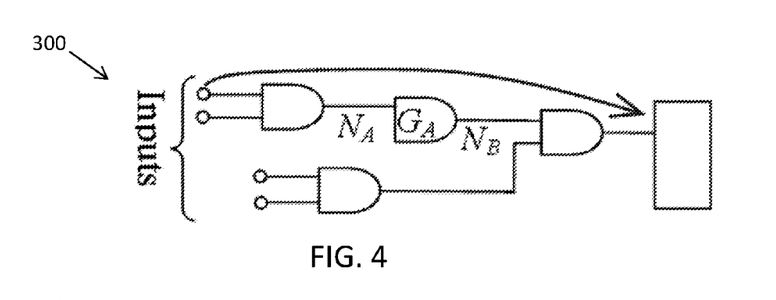
FIG. 4 is a logic circuit utilized by an incremental module included with a timing analysis tool configured to perform incremental time and optimization actions.

Turning now to FIG. 4, a logic circuit 300 utilized to perform incremental time and optimization actions is illustrated. FIG. 4 represents a generic logic circuit 300 where an optimization action is taken; in this case timing acceleration. Gate GA is resized to accelerate (i.e., speed up) the path. Since the parasitic properties of nets connected to GA and transistor sizes of GA change, the delay and signal slew of nets NA, NB and the delay of gates GA-1 and GA are re-calculated to take into account the parasitic properties of the nets changed as well as the transistor sizes inside the gates.

Figure 5:
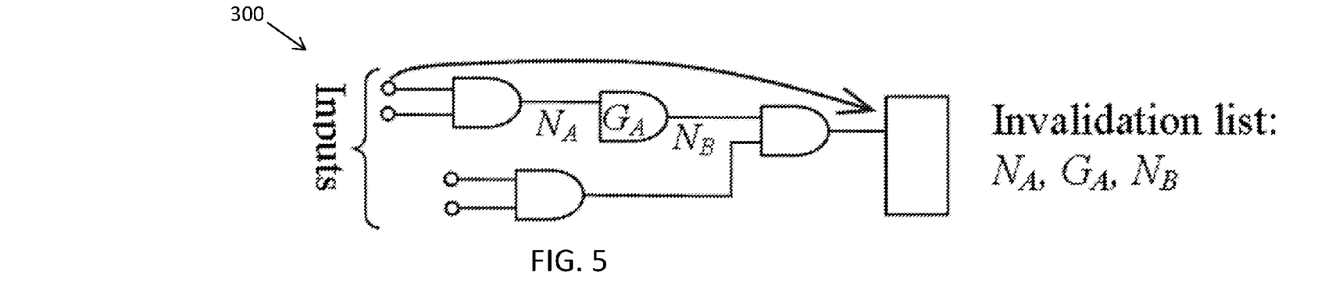
FIG. 5 illustrates the logic circuit of FIG. 4 capable of generating an incremental invalidation list based on a non-coupling scenario.

Turning to FIG. 5, an example of incremental time and optimization actions performed in a non-coupling scenario is shown. In the non-coupling scenario, the design components of the logic circuit 300 affected by the change are invalidated and placed in an invalidation list. Once timing information is requested, all components in the invalidation list are re-computed. In the process of speeding up gate GA if the designer requests slack at the output of the gate to see the improvement, all the design parts are re-computed before the output slack is displayed to the designer. The process of identifying the timing model which includes portions of a design that have been affected by a design change are left to an incremental module included with the timing analysis tool.

Figure 6:
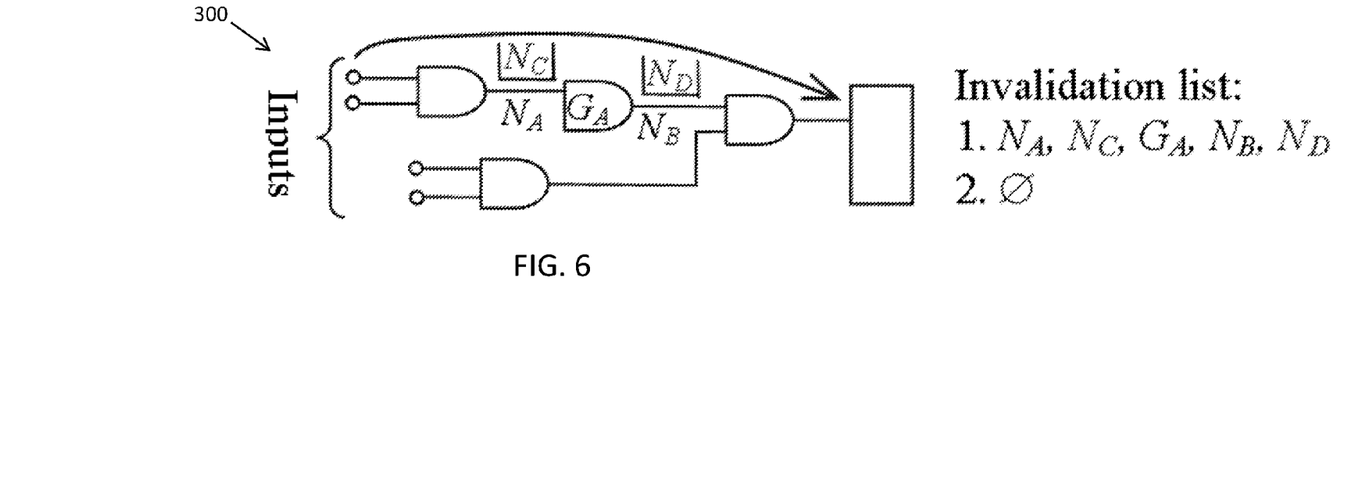
FIG. 6 illustrates the logic circuit of FIG. 4 capable of generating an incremental invalidation list following incremental time and optimization actions based on a coupling scenario according to a non-limiting embodiment.

Turning to FIG. 6, incremental time and optimization actions performed by an incremental analysis module in a coupling scenario are illustrated according to a non-limiting embodiment. In the coupling scenario, the design parts included in the logic circuit 300 and affected by the change are not only those parts physically connected to the changed component but also include the design parts coupled to components in the path. In the previous non-coupling scenario, if gate GA is optimized, only GA and nets NA-NB are invalidated (see FIG. 5). A coupling scenario may also present the need to invalidate additional nets, e.g., the nets directly coupled to nets NA and NB.

In the coupling scenario, however, the incremental analysis module is configured to collect new coupling events while the optimization is performed. That is, the incremental analysis module can collect new coupling events while simultaneously performing the optimization actions. While in a traditional approach the invalidation list contains all the parts of the design that need to be re-calculated, the coupling approach (i.e., incremental lists generated in a coupling scenario) differs in that the complete information is not known until the action is complete.

For example, in the optimization case illustrated in FIG. 6 (i.e., where a gate is re-powered) only one invalidation list is needed but is augmented with all the coupling nets, e.g., NC and ND, respectively. However, certain optimization actions may include execution of multiple operations. For example, if a first optimization activity is performed that includes, for example, promoting or demoting a net to a different layer (i.e., plane) and then routing the net in such layer, there is a need to take into account a secondary invalidation list. Therefore, after the net is routed, a second invalidation list is created with the new coupling nets. In at least one embodiment, the second invalidation list is generated based on a type of a first optimization action performed. Depending on the type of optimization used to perform the first optimization activity, there may be a need for re-routing which may occur at a different location of the original route. The new route couples to a new set of nets, which may need to be invalidated for re-calculation as discussed in greater detail below.

Once timing is requested the components in both lists are then recalculated. Although net promotion/demotions are described above, it should be appreciated that other optimization techniques composed of multiple actions may be performed. For example, an optimization technique that can be implemented may include swapping pins of a net between different gates. Accordingly, re-routing would be performed, which in turn would create a need to generate multiple invalidation lists.

Figure 7A:
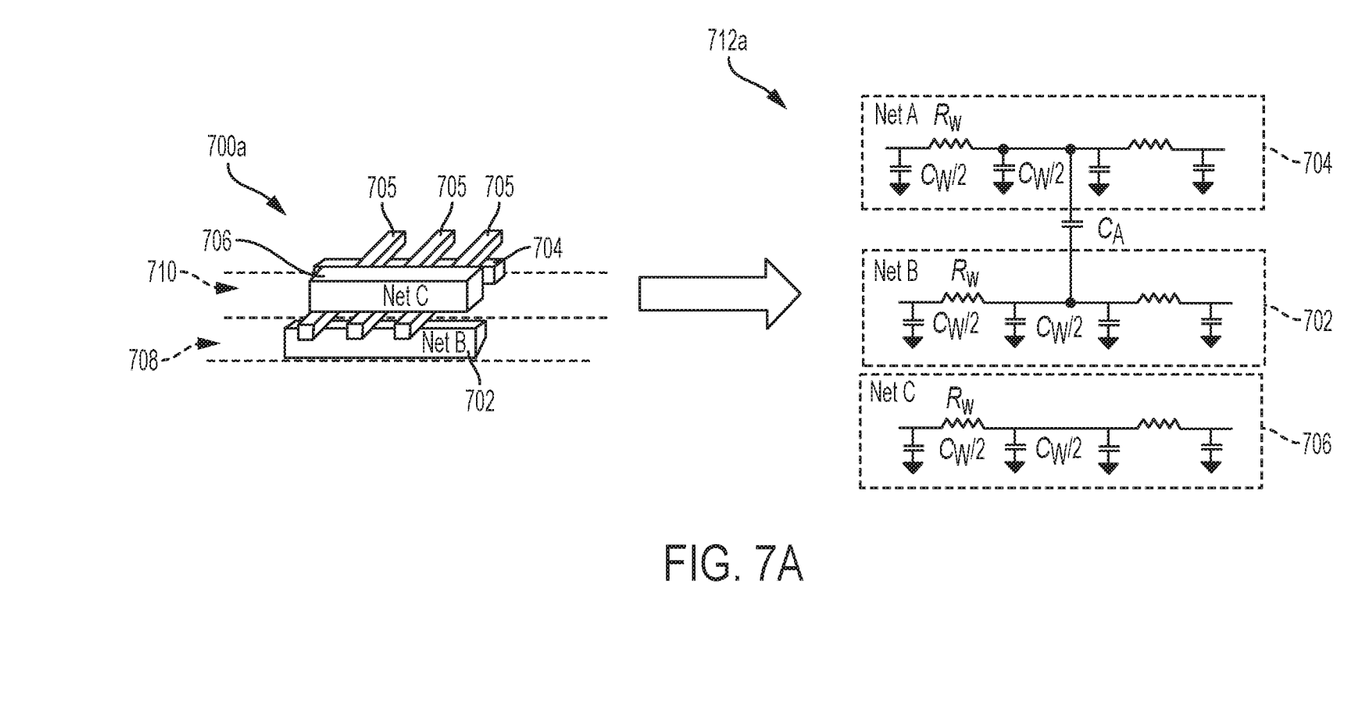
FIG. 7A illustrates an electrical network and equivalent RC circuit including a first net and adjacent aggressor net located in a first wiring level.
Figure 7B:
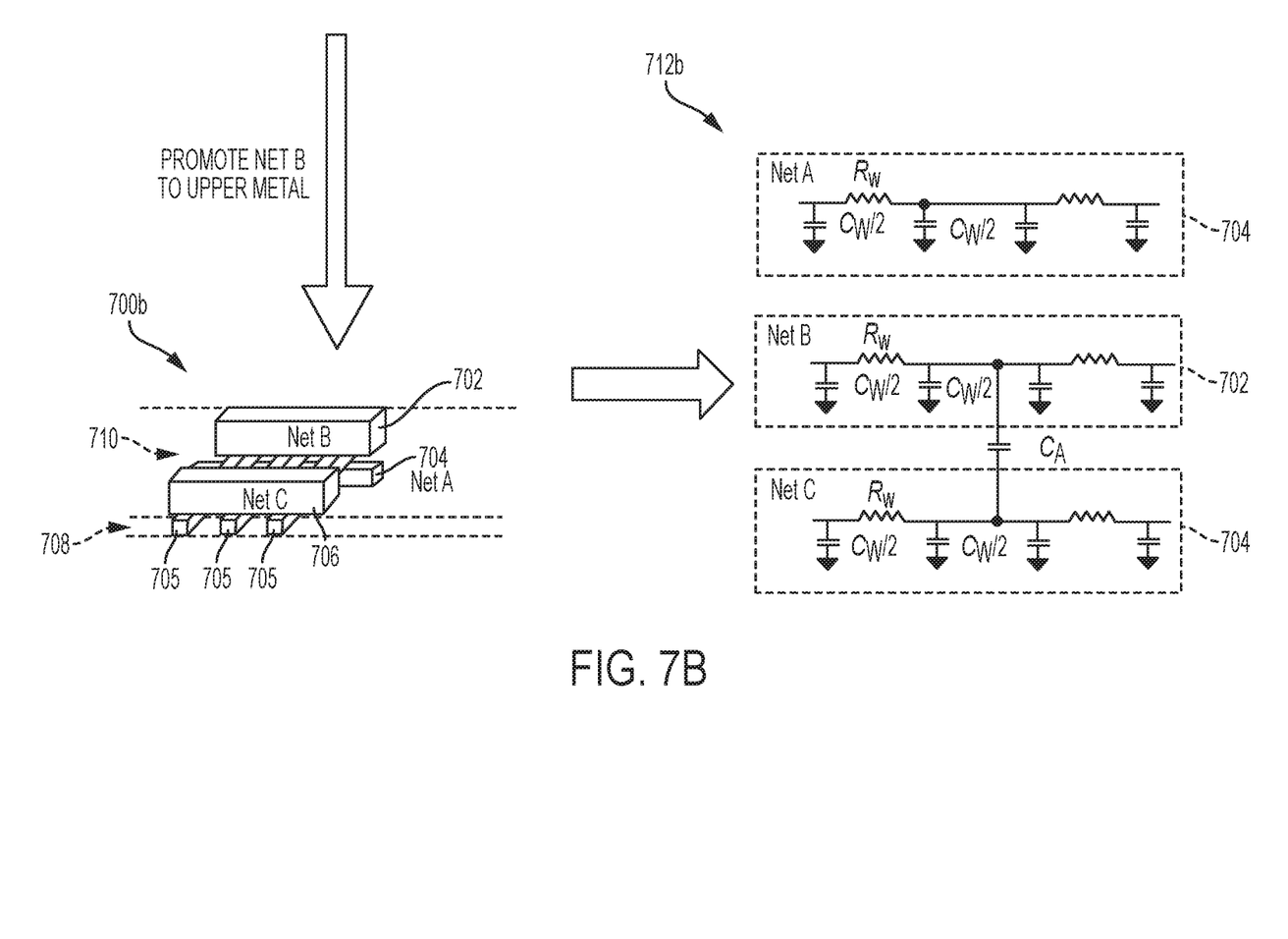
FIG. 7B illustrates an uplift promotion optimization action that collects new coupling data following the promotion of the first net shown in FIG. 7A to a higher wiring level.

Turning now to FIGS. 7A-7B, a net promotion and routing scheme performed by an incremental analysis system is illustrated according to a non-limiting embodiment. Referring to FIG. 7A, a first electrical network 700a includes a first net 702 (e.g., Net B), a second net 704 (e.g., Net A), and a third net 706 (e.g., Net C). The first net 702 and the second net 704 are formed in a first plane 708 (i.e., lower wiring layer 708), while the third net 706 is formed in a second plane 710 (i.e., upper wiring layer 710). That is, the first net 702 and the second net 704 are located below a plurality of conductor lines 705, while the third net 706 is located above the conductor lines 705. In the first electrical network 700a, the first net 702 (e.g., Net B) may be viewed as a victim net 702 while the adjacent second net 704 (e.g., Net A) may be viewed as an aggressor net 704.

Accordingly, a first equivalent RC network 712a is determined which models the first electrical network 700a. Since the first net 702 (e.g. Net B) is located at a different plane (i.e., the lower wiring layer 708) with respect to the third net 706 (e.g., Net C), the first net 702 is shown as being disconnected from the third net 706, but capacitively coupled to the second net 704 (e.g., Net A) as shown in the first equivalent RC network 712a.

Referring to FIG. 7B, the net promotion and routing scheme, for example, provides an optimization action that includes plane-level transition of the first net 702 (e.g., Net B) to define a second electrical network 700b. In at least one embodiment, plane-level transition includes, for example, the promotion of the first net 702 (e.g., Net B) from the first plane 708 to the second plane 710. As a result the first net 702 is then routed in the promoted plane 710 (i.e., the higher layer 710). Accordingly, the second equivalent RC network 712b shows the first net 702 (e.g., Net B) now disconnected from the second net 704, but capacitively coupled to the third net 706. In at least one embodiment, the act of promoting a victim net (e.g., Net B) triggers the creation of the first invalidation list containing Net B and all coupling nets, e.g. Net A. Therefore, affected netlist changes can be captured in three-dimensional space and the capture is action dependent. That is, the netlist change is determined in response to the promotion of the victim net, e.g., the first net 702 (Net B) from the first plane 708 to the second plane 710.

After the first net 702 (e.g., Net B) is re-routed and timing is requested for Net B, a timing analysis module according to a non-limiting embodiment can process the first invalidation list by calling extraction on Nets A and B to determine the new RC networks. Since Net B now couples to Net C, both nets are re-extracted and timing information is computed on both. Accordingly, a new invalidation list is created and extraction is performed according to the new invalidation list. In at least one embodiment, parasitic extraction is only dependent on the three-dimensional space around a net. When Net B is re-routed and the extraction is called on both invalidation lists, all the nets can then be extracted concurrently using multi-thread techniques. Furthermore, if the event translates into a secondary action such as re-routing a net in another area of the design or with different planes, a new set of nets are also selected for further analysis. Accordingly, design changes and secondary effects can be dynamically processed and optimized.

Figure 8:
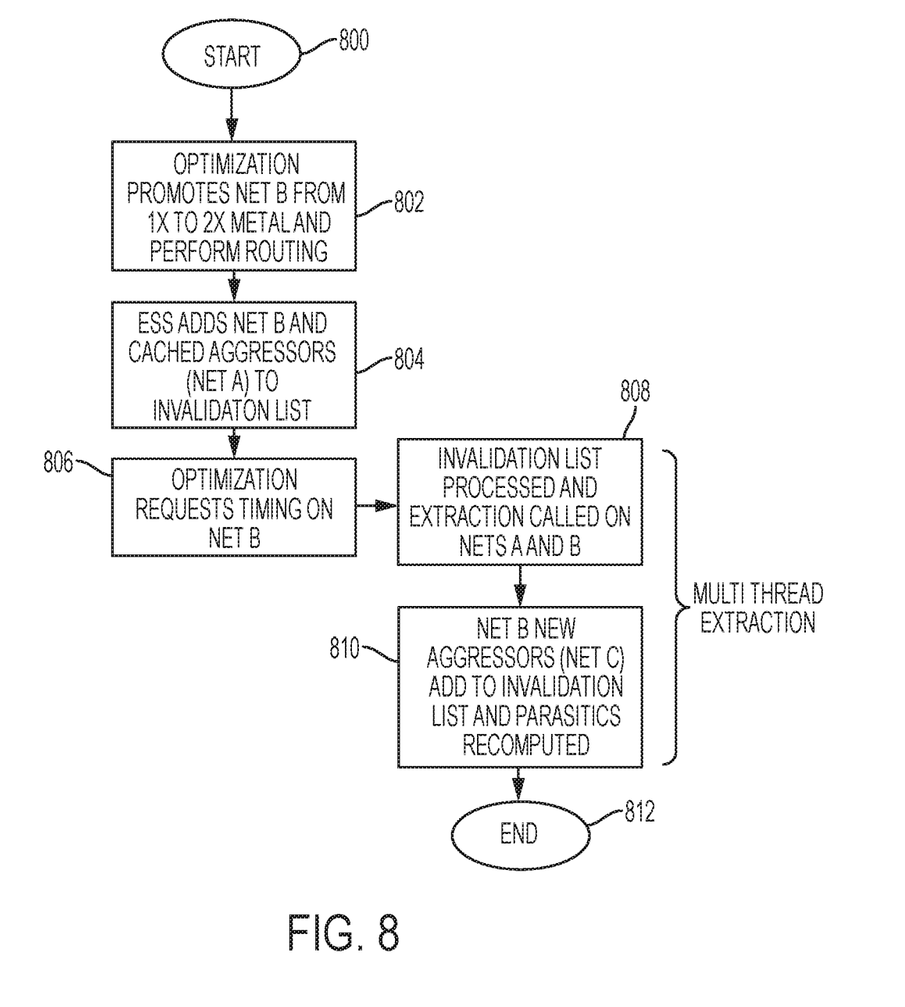
FIG. 8 is a flow diagram illustrating a method of performing optimization actions to promote and route a net according to a non-limiting embodiment.

Turning now to FIG. 8, a flow diagram illustrates a method of performing optimization actions to promote and route a net according to a non-limiting embodiment. The method begins at operation 800, and at operation 802 a first optimization activity is performed. In at least one embodiment, the optimization activity includes promoting a first net (e.g., Net B) from a first plane (1X) to a second, i.e., higher, plane (2X), and then performing routing on the promoted first net at the second plane. At operation 804, the first net (e.g., Net B) and one or more aggressor nets (e.g., Net A) are added to a first invalidation list. In at least one embodiment, the optimization actions performed at operation 802 triggers the creation of the first invalidation list containing Nets B and all coupling nets (e.g., Net A) at operation 804. At operation 806, a second optimization activity is performed. In at least one embodiment, the second optimization activity includes, for example, requesting timing optimization on the first net (e.g., Net B) after Net B is re-routed.

At operation 808, the first invalidation list is processed (e.g., by a timing module) and an extraction process is performed on the first net (e.g., Net B) and the second net (e.g., Net A). The extraction process includes, for example, extracting capacitance information and resistance information between the first net and the second net. Accordingly, new RC networks are determined. At operation 810, the first net (e.g., Net B) and one or more new aggressor nets (e.g., Net C) are added to a newly created (i.e., second) invalidation list and the parasitic coupling is re-computed, and the method ends at operation 812. In at least one embodiment, parasitic extraction is only dependent on the three-dimensional space around a net. Accordingly, the first net (e.g., Net B) may be re-routed and the extraction can be performed according to both the first and second invalidation lists such that multi-thread extraction is achieved. During timing closure, various types of optimization actions can be taken to resolve a given timing fail. The various optimization actions include, but are not limited to, improving slack, and resolving a slew violation.

Figure 9:
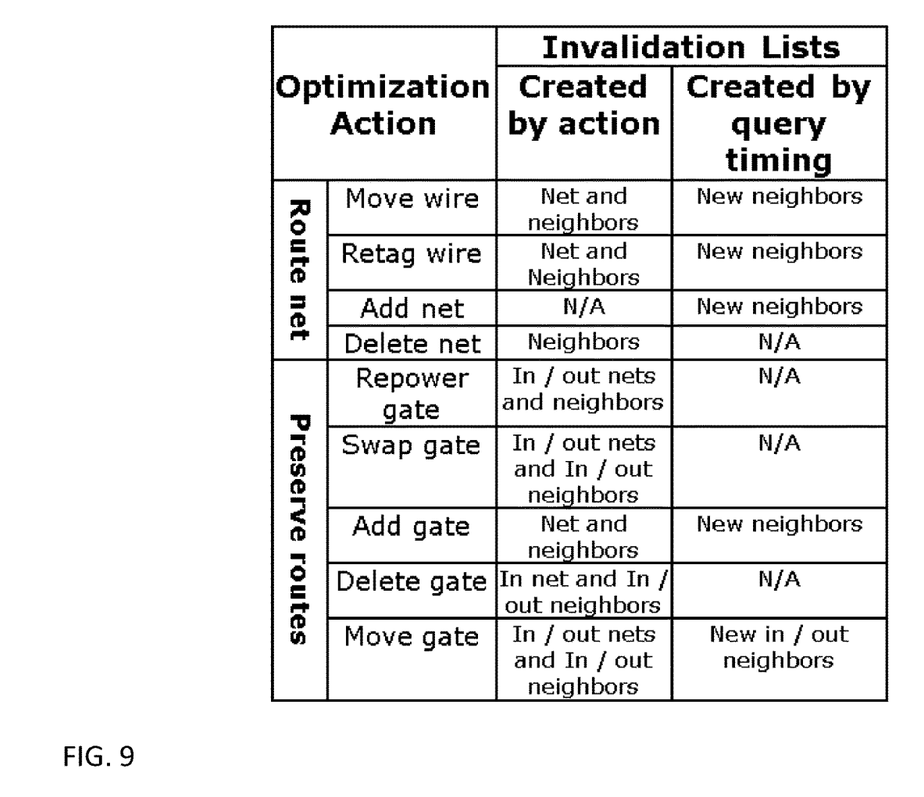
FIG. 9 illustrates various optimization actions that may be performed to resolve timing faults according to a non-limiting embodiment.

FIG. 9 illustrates a table showing a comprehensive list of various optimization actions and the type of invalidation lists that may be performed. The table is divided in two sections. The first section lists the actions that require the net to be explicitly routed after the action. Since all actions in this section (except the last action) require nets to be routed, there will be a requirement to collect the second invalidation list. The second section of the table describes optimization actions applied on gates in the design. These actions are performed in a mode where existing routes are preserved. The mode improves runtime because it only requires re-calculations on affected nets, such as in the case of repowering or swapping a gate. Different power levels of a gate may have different pin locations, but the majority of the net does not have to be re-routed. Accordingly, the mode improves speed and predictability of optimization.

Figure 10:
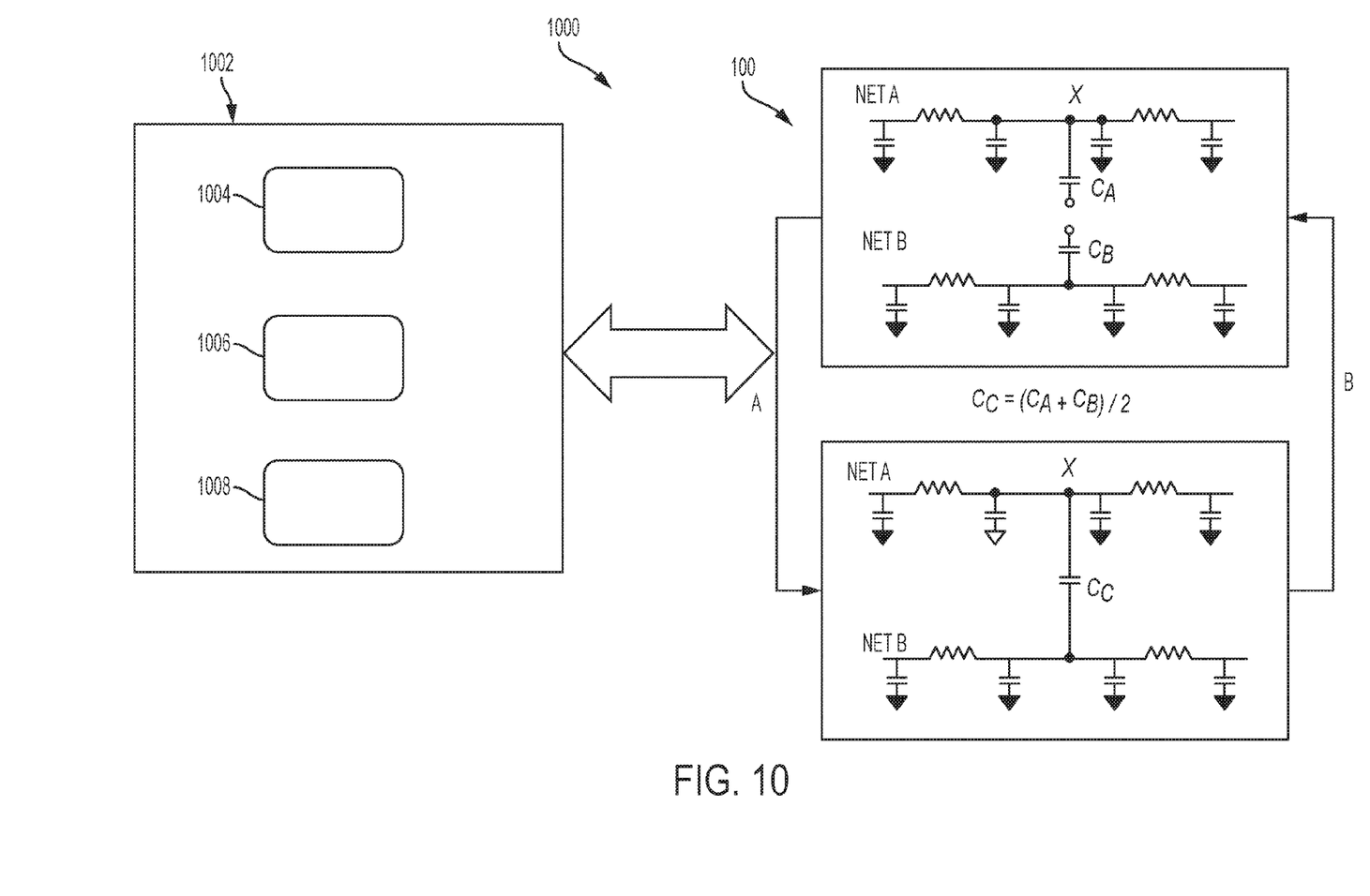
FIG. 10 is a block diagram illustrating an incremental parasitic extraction system according to a non-limiting embodiment.

Turning now to FIG. 10, an incremental parasitic extraction system 1000 including a parasitic extraction module 1002 configured to optimize a semiconductor device based on a modeled resistance-capacitance (RC) network 100 is illustrated according to a non-limiting embodiment. The parasitic extraction module 1002 includes an electronic noise analyzer module 1004, an electronic optimizer module 1006, and an electronic extraction module 1008. The noise analysis module 1004 is configured to perform a first noise analysis on one or more first nets (e.g., a victim net) with respect to one or more second nets (e.g., an aggressor net) located adjacent to the victim net.

The optimizer module 1006 is configured to perform a first optimization activity on the at least one first net based on results of the first noise analysis. The first optimization activity includes, but is not limited to, layer promotion, layer demotion, buffer insertion, gate location change, gate type change, and logic equivalent port swap.

In addition, the optimizer module 1006 generates one or more invalidations lists. In at least one embodiment, the optimizer module 1006 generates a first invalidation list based on the first optimization activity, and a second invalidation list based on a type of the first optimization action. The type of optimization includes, but is not limited to, promotion and/or demotion of a net to a different plane, swapping the pins of a net between gates without changing the logic equivalency, moving a gate from one location to another, and replacing the gate with a different type of gate. These types of optimization actions require at least two operations. For example, a first operation may include the action described by the optimization, and a second operation may include the re-routing of all affected nets. The second invalidation list is then added to the first invalidation list. In at least one embodiment, the first invalidation list includes identifying noise (e.g., parasitic noise) of the at least one aggressor net.

The extraction module 1008 is configured to process the first and second invalidation lists. For example, the extraction module 1008 may perform an extraction and noise analysis process based on the first and second invalidation lists so as to determine at least one new RC network and associated noise analysis results. In this manner, the semiconductor device may be optimized according to extracted information that corresponds to the at least one new RC network and the associated noise analysis results.

As described above, various embodiments of the disclosure provide an incremental parasitic extraction system that achieves coupled timing and power optimization of a semiconductor network formed on a semiconductor chip. In at least one non-limiting embodiment, the incremental parasitic extraction system operates as an evaluation system capable of registering all the design changes, but recalculates an analysis parameter only if a function, tool or the designer requests the parameter. In at least one embodiment, the incremental parasitic extraction system combines and un-combines extracted parasitic RC networks comprising a plurality of nets to perform incremental uplift noise analysis. Accordingly, incremental extraction and analysis may be achieved from a runtime standpoint while maintaining accuracy.

As used herein, the term "module" refers to an application specific integrated circuit (ASIC), an electronic circuit, an electronic computer processor (shared, dedicated, or group) and memory that executes one or more software or firmware programs, a combinational logic circuit, an electronic hardware controller, a microcontroller and/or other suitable components that provide the described functionality. When implemented in software, a module can be embodied in memory as a non-transitory machine-readable storage medium readable by a processing circuit and storing instructions for execution by the processing circuit for performing a method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of optimizing a semiconductor device, the method comprising:
    performing, by a computer system, a first noise analysis on at least one first net included with the semiconductor device with respect to at least one aggressor net of the semiconductor device located adjacent to the at least one first net;
    performing, by the computer system, a first optimization activity on the at least one first net based on results of the first noise analysis;
    generating, by the computer system, a first invalidation list based on the first optimization activity;
    generating, by the computer system, a second invalidation list based on a type of the first optimization action, wherein the type of the first optimization action includes re-routing of at least one of a promoted or demoted net to define a new route, and wherein the second invalidation list includes at least one new net coupled to the new route;
    adding the second invalidation list to the first invalidation list; and
    processing, by the computer system, the first and second invalidation lists and performing an extraction and noise analysis process on the first and second invalidation lists so as to determine capacitance information and resistance information that defines at least one new RC network of the semiconductor device and associated noise analysis results of the semiconductor device, wherein the at least one new RC network is implemented in a semiconductor device design and the semiconductor device including the at least one new RC network is fabricated based on the semiconductor device design.

2. The method of claim 1, wherein generating the first invalidation list includes identifying parasitic noise of the at least one aggressor net.

3. The method of claim 1, wherein the first optimization activity includes at least one of layer promotion, layer demotion, buffer insertion, gate location change, gate type change, and logic equivalent port swap.

4. The method of claim 1, further comprising optimizing the semiconductor device based on extracted information corresponding to the at least one new RC network and the associated noise analysis results.

5. The method of claim 4, wherein the at least one new RC network includes the at least one first net and at least one new aggressor net excluded from the first optimization activity.

6. The method of claim 5, wherein the extraction and noise analysis process includes computing parasitic coupling of the semiconductor device based on the second invalidation list.

7. The method of claim 6, wherein the second optimization activity includes requesting timing optimization on the at least one first net.

8. An incremental parasitic extraction system, comprising:
    a noise analysis module including an electronic hardware controller configured to perform a first noise analysis on at least one first net with respect to at least one aggressor net located adjacent to the at least one first net;
    an optimizer module including an electronic hardware controller configured to perform:
    a first optimization activity on the at least one first net based on results of the first noise analysis,
    to generate a first invalidation list based on the first optimization activity,
    to generate a second invalidation list based on a type of the first optimization action, wherein the type of the first optimization action includes re-routing of at least one of a promoted or demoted net to define a new route, and wherein the second invalidation list includes at least one new net coupled to the new route, and
    to add the second invalidation list to the first invalidation list; and
    an extraction module including an electronic hardware controller configured to process the first and second invalidation lists and perform an extraction and noise analysis process on the first and second invalidation lists so as to determine capacitance information and resistance information that defines at least one new RC network and associated noise analysis results.

9. The system of claim 8, wherein generating the first invalidation list includes identifying noise of the at least one aggressor net.

10. The system of claim 8, wherein the first optimization activity includes at least one of layer promotion, layer demotion, buffer insertion, gate location change, gate type change, and logic equivalent port swap.

11. The system of claim 8, further comprising optimizing the semiconductor device based on extracted information corresponding to the at least one new RC network and the associated noise analysis results.

12. The system of claim 11, wherein the at least one new RC network includes the first net and at least one new aggressor net excluded from the first optimization activity.

13. The system of claim 12, wherein the extraction and noise analysis process includes computing parasitic coupling based on the second invalidation list.

14. The system of claim 13, wherein the second optimization activity includes requesting timing optimization on the at least one first net.

15. A computer program product to control an electronic device to optimize a semiconductor device, the computer program product comprising a computer readable storage medium having program instructions embodied therewith, the program instructions executable by an electronic computer processor to control the electronic device to perform operations comprising:
    performing, by the computer processor, a first noise analysis on at least one first net included with semiconductor device with respect to at least one aggressor net included with the semiconductor device located adjacent to the at least one first net;
    performing, by the computer processor, a first optimization activity on the at least one first net based on results of the first noise analysis;
    generating, by the computer processor, a first invalidation list based on the first optimization activity;
    generating, by the computer processor, a second invalidation list based on a type of the first optimization action, wherein the type of the first optimization action includes re-routing of at least one of a promoted or demoted net to define a new route, and wherein the second invalidation list includes at least one new net coupled to the new route;
    adding the second invalidation list to the first invalidation list; and
    processing, by the computer processor, the first and second invalidation lists and performing an extraction and noise analysis process on the first and second invalidation lists so as to determine capacitance information and resistance information that defines at least one new RC network of the semiconductor device and associated noise analysis results corresponding to the semiconductor device,
    wherein the at least one new RC network is implemented in a semiconductor device design and the semiconductor device including the at least one new RC network is fabricated based on the semiconductor device design.

16. The computer program product of claim 15, wherein generating the first invalidation list includes identifying noise of the at least one aggressor net.

17. The computer program product of claim 15, wherein the first optimization activity includes at least one of layer promotion, layer demotion, buffer insertion, gate location change, gate type change, and logic equivalent port swap.

18. The computer program product of claim 15, further comprising optimizing the semiconductor device based on extracted information corresponding to the at least one new RC network and the associated noise analysis results.

19. The computer program product of claim 18, wherein the at least one new RC network includes the first net and at least one new aggressor net excluded from the first optimization activity.

20. The computer program product of claim 19, wherein the extraction and noise analysis process includes computing parasitic coupling of the semiconductor device based on the second invalidation list.

* * * * *